US008010846B1

(12) United States Patent
Birkedahl et al.

(10) Patent No.: US 8,010,846 B1
(45) Date of Patent: Aug. 30, 2011

(54) SCALABLE SELF-CHECKING PROCESSING PLATFORM INCLUDING PROCESSORS EXECUTING BOTH COUPLED AND UNCOUPLED APPLICATIONS WITHIN A FRAME

(75) Inventors: Byron Birkedahl, Glendale, AZ (US);
Nicholas Wilt, Glendale, AZ (US); Art McCready, Glendale, AZ (US);
Brendan Hall, Eden Prairie, MN (US);
Aaron Larson, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 12/419,153

(22) Filed: Apr. 6, 2009

Related U.S. Application Data

(60) Provisional application No. 61/049,242, filed on Apr. 30, 2008.

(51) Int. Cl.
*G06F 11/00* (2006.01)
*G06F 11/14* (2006.01)
(52) U.S. Cl. .............. 714/38.1; 714/11; 714/12
(58) Field of Classification Search ............ 714/11, 714/12, 38.1
See application file for complete search history.

(56) References Cited

U.S. PATENT DOCUMENTS

| | | | |
|---|---|---|---|
| 3,810,119 A | | 5/1974 | Zieve et al. |
| 5,233,615 A | | 8/1993 | Goetz |
| 5,613,127 A | * | 3/1997 | Schultz .................. 713/502 |
| 5,978,936 A | * | 11/1999 | Chandra et al. ............. 714/43 |
| 6,223,304 B1 | | 4/2001 | Kling et al. |
| 6,434,712 B1 | * | 8/2002 | Urban et al. ................ 714/12 |
| 6,567,840 B1 | | 5/2003 | Binns et al. |
| 6,640,313 B1 | | 10/2003 | Quach |
| 6,751,749 B2 | * | 6/2004 | Hofstee et al. ............... 714/11 |
| 6,823,251 B1 | * | 11/2004 | Giers ......................... 701/76 |
| 6,854,051 B2 | * | 2/2005 | Mukherjee ................. 712/248 |
| 6,880,119 B1 | * | 4/2005 | Bohlin ....................... 714/732 |
| 7,017,073 B2 | * | 3/2006 | Nair et al. ................... 714/11 |
| 7,206,964 B2 | * | 4/2007 | Moser et al. ................ 714/13 |

(Continued)

FOREIGN PATENT DOCUMENTS

FR 2748136 10/1997

(Continued)

OTHER PUBLICATIONS

European Patent Office, "European Search Report", Aug. 6, 2009, Published in: EP.

(Continued)

*Primary Examiner* — Scott T Baderman
*Assistant Examiner* — Joseph Schell
(74) *Attorney, Agent, or Firm* — Fogg & Powers LLC

(57) ABSTRACT

Methods and systems for a scalable self-checking processing platform are described herein. According to one embodiment, during an execution frame, a first processing element executes both a high-criticality application and a first low-criticality application. During that same execution frame, a second processing element executes both the high-criticality application and a second low-criticality application. The high-criticality application output from the first processing element is compared with that from the second processing element before the next execution frame, and a fault occurs when the output does not match. The low-criticality application is not duplicated or compared. This and other embodiments allow high-criticality applications to be appropriated checked while avoiding the over-dedication of resources to low-criticality applications that do not warrant self-checking.

20 Claims, 2 Drawing Sheets

U.S. PATENT DOCUMENTS

| | | | |
|---|---|---|---|
| 7,302,685 B2 * | 11/2007 | Binns et al. | 718/103 |
| 7,373,548 B2 * | 5/2008 | Reinhardt et al. | 714/13 |
| 7,870,439 B2 * | 1/2011 | Fujiyama et al. | 714/11 |
| 7,937,621 B2 * | 5/2011 | Wang et al. | 714/21 |
| 2002/0144175 A1 * | 10/2002 | Long et al. | 714/11 |
| 2003/0208704 A1 | 11/2003 | Bartels et al. | |
| 2005/0022054 A1 | 1/2005 | Rasmussen et al. | |
| 2006/0195751 A1 * | 8/2006 | Hess et al. | 714/746 |
| 2006/0282702 A1 * | 12/2006 | Bando et al. | 714/11 |
| 2007/0283195 A1 | 12/2007 | Reinhardt et al. | |
| 2009/0307770 A1 * | 12/2009 | Harris et al. | 726/22 |

FOREIGN PATENT DOCUMENTS

GB 2260430 4/1993

OTHER PUBLICATIONS

Lohmann, "Sicherheit Von Mikrocomputern Fur Die Eisenbahnsignal Technik", Jan. 1, 1980, pp. 229-233, 236, vol. 22, No. 5, Publisher: Elektronishche Rechenanlagen.

* cited by examiner

SCALABLE SELF-CHECKING PROCESSING PLATFORM INCLUDING PROCESSORS EXECUTING BOTH COUPLED AND UNCOUPLED APPLICATIONS WITHIN A FRAME

RELATED APPLICATION

This application claims priority to U.S. Provisional Application No. 61/049,242, "Scaleable (sic) Self-Checking Processing Platform," filed Apr. 30, 2008, the entirety of which is incorporated by reference herein.

FIELD

The present invention relates to self-checking processing platforms, and more particularly, scalable self-checking processing platforms.

BACKGROUND

Fully self-checking processing is the operation of processors in lock-step such that they perform identical operations at the same time. Each processor, or each lane of processors, has redundant detection circuitry that ensures that a processor or lane's operation is identical to that of the cross lane. Any discrepancy causes the operation of both processing lanes to be shutdown or pacified. This "self-checking" technique provides a very high level of assurance that any malfunction is automatically detected and pacified—on the order of a $10^{-9}$ probability of an undetected malfunction per hour—and can also allow the rapid detection and pacification of the malfunction—e.g., in less than 100 ns.

Fully self-checking processing may be very useful for guaranteeing the integrity of high-criticality computing applications such as avionics. A key advantage of the self-checking design is that software applications can be hosted onto the platform, and high integrity achieved, without incorporating any special architectural mitigation (e.g. performance monitoring or custom cross monitoring).

The downside of full self-checking is that it requires two identical processing platforms, and thus resource allocation, like cost, board area, and heat dissipation, may as much as double relative to a single-string design approach. Further, every application that executes on the platform incurs these costs, regardless of its particular level of criticality. Therefore, a fully self-checking platform is most efficient when it exclusively executes high-criticality applications.

A non-self-checking "single-string" processing design is an alternative to the fully self-checking platform. The single-string design is generally less costly in terms of expense, board area, and heat dissipation than a self-checking design, assuming the same amount of processing power. However, this design is limited to an integrity level on the order of a probability of undetected malfunction of $10^{-6}$ per hour, precluding its use for high-integrity computations.

SUMMARY

Methods and systems are described herein for the implementation of a scalable self-checking processing platform.

According to an exemplary method, during an execution frame, a first processing element executes a first instance of a frame-locked application and a first uncoupled application. During the same execution frame, a second processing element executes a second instance of the frame-locked application and a second uncoupled application. Further, a fault occurs when a first output stream from the first processing element's execution of the first instance of the frame-locked application differs from a second output stream from the second processing element's execution of the second instance of the frame-locked application.

Another embodiment is a system comprising a first processing element connected to a first bus and a second processing element connected to a second bus. Additionally, a first I/O controller—comprising a first comparator and a first control module—is connected to the first bus and to the second bus. The first control module controls the first processing element and the first comparator. Similarly, a second I/O controller—comprising a second comparator and a second control module—is also connected to the first bus and to the second bus. The second control module controls the second processing element and the second comparator.

During an execution frame, a first instance of a high-integrity application executes on the first processing element, generating a first output stream to the first bus, and a second instance of the high-integrity application executes on the second processing element, generating a second output stream to the second bus. The first comparator compares the first output stream with the second output and detects a fault if the first output stream and the second output stream differ, and the second comparator does the same. Also during the execution frame, a first uncoupled application executes on the first processing element, and a second uncoupled application executes on the second processing element.

Yet another embodiment is a system comprising a plurality of processing elements in a first processing lane connected to a first bus and a plurality of processing elements in a second processing lane connected to a second bus. A first I/O controller, comprising a first comparator and a first control module, is connected to the first bus and to the second bus. The first control module controls the first processing lane and the first comparator. A second I/O controller, comprising a second comparator and a second control module, is also connected to the first bus and to the second bus. The second control module controls the second processing lane and the second comparator.

During an execution frame, a first instance of a high-integrity application executes on at least one processing element in the first processing lane, generating a first output stream to the first bus, and a second instance of the high-integrity application executes on at least one processing element in the second processing lane, generating a second output stream to the second bus. The first comparator then compares the first output stream to the second output stream and detects a fault if the first output and the second output differ. The second comparator also compares the first output to the second output and detects a fault if the first output and the second output differ.

During that same execution frame, a plurality of uncoupled applications execute on the processing elements in the first processing lane, at times when those processing elements are not executing the first instance of the high-integrity application, and on the processing elements in the second processing lane, at times when those processing elements are not executing the second instance of the high-integrity application.

Alternate embodiments may include staggering the times during the execution frame when the high-criticality or high-integrity application executes on one processing element and when the application executes on another processing element. Such staggering may require the use of buffers on the output streams to allow the output to be properly aligned for comparison. Additionally, a schedule or configuration file may outline the scheduling of high-criticality and low-criticality applications on the various processing elements, and the control modules may dictate the operation of processing elements according to such a schedule.

DETAILED DESCRIPTION

Figure 1:
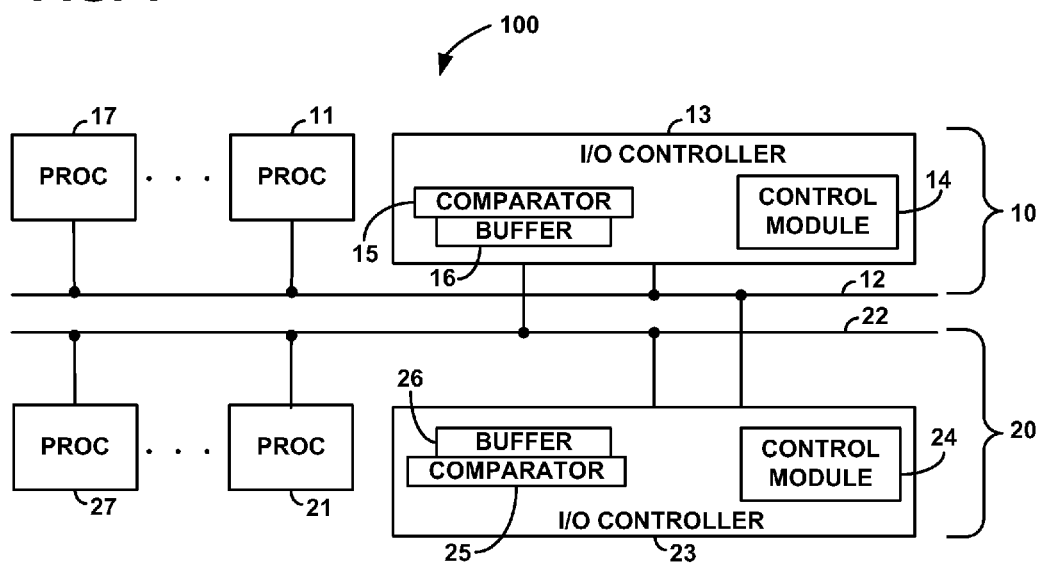
FIG. 1 is a block diagram illustrating a system for scalable self-checking processing, according to an embodiment of the invention.

FIG. 1 is a block diagram illustrating a system 100 for scalable self-checking processing, according to an embodiment of the invention. System 100 consists of two substantially independent processing lanes, a lane 10 and a lane 20. Lane 10 consists of a processing element 11 communicatively connected, through a bus 12, to an input-output (I/O) controller 13. Similarly, lane 20 consists of a processing element 21 communicatively connected, through bus 22, to an I/O controller 23. Processing elements 11 and 21 may be any hardware, circuitry, or logical unit capable of executing computer code, such as central processing units, cores, or complete processors. In a preferred embodiment, processing elements 11 and 21 are each multi-threaded, meaning that multiple, distinct applications may execute on that single processing element over the same period of time by trading off for various processing resources.

Buses 12 and 22 may be internal communication links between processing elements 11 and 21 and I/O controllers 13 and 23, or may be data buses linked to other functional units in the platform that are not shown. Alternatively, other data buses may be connected to the elements in system 100 to coordinate communication with the rest of the platform.

Sub-units of I/O controller 13 include a control module 14, a comparator 15, and a buffer 16. I/O controller 13 communicates with processing element 11 via bus 12 to coordinate the operation of processing element 11 and to control the flow of input to processing element 11 and output from processing element 11. In particular, control module 14 may contain logic and instructions for determining what applications execute on processing element 11 and at what times. Control module 14 may be implemented using an application-specific integrated circuit (ASIC).

Unlike processing element 11, I/O controller 13 is connected to bus 22 of lane 20. This connection, along with the connection between I/O controller 13 and bus 12, gives I/O controller 13 access to output data from both processing lanes. Comparator 15 may, therefore, compare output data from one processing element or lane to output data from another processing element or lane, for example by comparing the two output data streams bit-by-bit. Control module 14 controls when comparator 15 is enabled to make such a comparison and when comparator 15 is disabled and does not compare. Buffer 16 may be linked to comparator 15 and may buffer the data streams from either or both of buses 12 and 22. Comparator 15 may compare data streams buffered by buffer 16 rather than comparing the data from buses 12 and 22 in real time.

In lane 20, sub-units of I/O controller 23 include a control module 24, a comparator 25, and a buffer 26. I/O controller 23 communicates with processing element 21 via bus 22 to coordinate the operation of processing element 21 and to control the flow of input to processing element 21 and output from processing element 21. In particular, control module 24 may contain logic and instructions for determining what applications execute on processing element 21 and at what times. Control module 24 may be implemented using an application-specific integrated circuit (ASIC).

Unlike processing element 21, I/O controller 23 is connected to bus 12 of lane 10. This connection, along with the connection between I/O controller 23 and bus 22, gives I/O controller 23 access to output data from both processing lanes. Comparator 25 may, therefore, compare output data from one processing element or lane to output data from another processing element or lane, for example by comparing the two output data streams bit-by-bit. Control module 24 controls when comparator 25 is enabled to make such a comparison and when comparator 25 is disabled and does not compare. Buffer 26 may be linked to comparator 25 and may buffer the data streams from either or both of buses 12 and 22. Comparator 25 may compare data streams buffered by buffer 26 rather than comparing the data from buses 12 and 22 in real time.

The processing power of system 100 may be increased by the addition of processing elements to either lane 10 or lane 20. For example, one or more processing elements, such as a processing element 17, may be added to lane 10 by connecting those elements to bus 12. I/O controller 13 could control additional processing elements like processing element 17 in the same manner in which it controls processing element 11. Additional processing element 17 would not compromise the integrity of system 100 unless it was connected to both processing lanes. As another example, one or more processing elements, such as a processing element 27, may be added to lane 20 by connecting those elements to bus 22. I/O controller 23 could control additional processing elements like processing element 27 in the same manner in which it controls processing element 21. Additional processing element 27 would not compromise the integrity of system 100 unless it was connected to both processing lanes. Further, lane 10 may maintain a different number of processing elements than lane 20 maintains. System 100 could also be expanded by the addition of entire processing lanes or pairs of processing lanes, each lane complete with its own bus and I/O controller.

Processing elements 17 and 27, and indeed any additional processors, may be any hardware, circuitry, or logical unit capable of executing computer code, such as central processing units, cores, or complete processors. In a preferred embodiment, processing elements 17 and 27 are each multi-threaded, meaning that multiple, distinct applications may execute on that single processing element over the same period of time by trading off for various processing resources.

The isolation of each lane 10 and lane 20 from the other lane allows system 100 to execute high-criticality applications. For example, the same application may execute on processing elements in lane 10 and on processing elements in lane 20, and the respective output data streams may be compared. If the data streams are identical, there is a high likelihood that neither lane has suffered a fault.

It should be understood, however, that this and other arrangements and processes described herein are set forth for purposes of example only, and other arrangements and elements (e.g., machines, interfaces, functions, and orders of elements) can be added or used instead and some elements may be omitted altogether. For example, more processing elements or processing lanes may be added to the configuration shown in FIG. 1. Further, as in most computer architectures, those skilled in the art will appreciate that many of the elements described herein are functional entities that may be implemented as discrete components or in conjunction with other components, in any suitable combination and location.

System 100 may be used for scalable self-checking processing. More particularly, system 100 may execute multiple applications at once, using the dual-lane configuration to verify the fault-free execution of high-criticality applications, and using only a single lane's capability to execute each lower-criticality application. Such flexibility means that excess system resources are not wasted on lower-criticality applications and yet the integrity of the higher-criticality applications is maintained.

Figure 2:
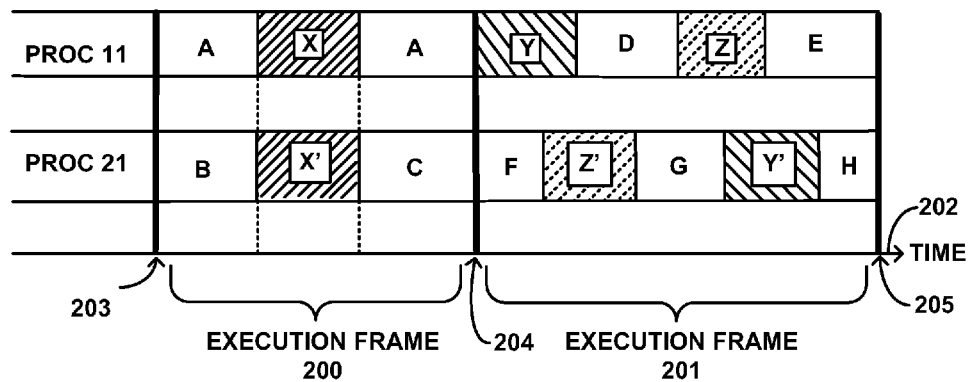
FIG. 2 is a timing diagram illustrating the execution of multiple programs of varying levels of criticality on two processors, according to another embodiment of the invention.

As an example, FIG. 2 shows of the execution of several applications or programs on several processing elements, according to embodiments of the invention. In particular, FIG. 2 depicts processing elements 11 and 21 each executing multiple applications over several execution frames. To allow the scalable self-checking processing, execution of each processing element may be divided in intervals called "execution frames" with the beginning and ending of an execution frame occurring at the same time on each processing element. In FIG. 2, execution frame 200 is followed by execution frame 201 when graphed along a time axis 202. Indeed, on both processing element 11 and processing element 21, execution frame 200 begins at time 203 and ends at time 204, and execution frame 201 begins at time 204 and ends at time 205.

For the purposes of illustration, applications A, B, C, D, E, F, G, and H are low-criticality applications that do not need to be redundantly executed. Because these applications are executed only on one processing lane, they may also be referred to as "uncoupled applications." Applications X, Y, and Z are high-criticality applications that do need to be redundantly executed. An application may be any set of computer instructions of any length or functionality. An application need not be a complete program.

Over execution frame 200, processing element 11 executes application A, then switches to executing application X, and then switches back to executing application A. Processing element 21, on the other hand, executes application B, then switches to executing application X-X' ("X prime") is the copy or instance, local to processing element 21, of the application X that processing element 11 executes during execution frame 200—and then switches to executing application C.

In the example shown in FIG. 2, during execution frame 200, the high-criticality application X is executed at the same point in the execution frame for both processing elements 11 and 21. Therefore, to verify the integrity of application X, the output data streams for processing elements 11 and 21 may be compared in real-time beginning when both begin to output data related to application X and continuing until both have completed outputting data related to application X. That the output streams are identical over the duration of the comparison ensures the integrity (fault-free operation) of high-criticality application X.

In an alternate embodiment, the output data streams from processing element 11 executing application X and from processing element 21 executing application X' may be buffered before any comparison is made. For the integrity of the system to be maintained in such an embodiment, the comparison would not need to be in real-time; rather it may complete before the transition from one execution frame to the next—as shown in FIG. 2, before the transition from execution frame 200 to execution frame 201. For example, buffer 16 may buffer data streams from both bus 12 and bus 22, and comparator 15 may read from buffer 16 and compare the buffered data streams. Similarly, buffer 26 may buffer data streams from both bus 12 and bus 22, and comparator 25 may read from buffer 26 and compare the buffered data streams. Because of this frame-by-frame synchronization of high-criticality applications, such applications, like application X, may also be referred to as a "frame-locked applications."

In alternate embodiments, there may be a time lag between the completion of an execution frame and the comparison that maintains the integrity of the system. Further, different applications may operate on staggered execution frames or execution frames having different durations. These embodiments carry the risk of allowing faulty output data streams to be transmitted to the system at large before a fault is detected. They may also carry the benefit of allowing a more efficient use of resources based on an increased schedule flexibility. Additionally, pacification procedures may be used to correct any faulty output data streams transmitted to the system at large.

Multiple high-criticality applications and multiple low-criticality applications may all be scheduled together. For example, processing elements 11 and 21 execute two high-criticality applications and three low-criticality applications over the course of execution frame 201. Processing element 11 begins by executing application Y, switches to executing application D, then switches to application Z, and then switches to application E. Processing element 21, on the other hand, begins by executing application F, switches to executing application Z', then switches to application G, switches next to application Y', and then completes the execution frame by executing application H.

For the integrity of the system to be maintained for execution frame 201, the execution of application Y must be checked against the execution of application Y', and the execution of application Z must be checked against the execution of application Z'. In execution frame 201, the respective processing elements' executions of the high-criticality applications occur at staggered times during the frame, therefore output from at least one processing element must be buffered before either lane's comparison of either high-criticality application may occur. Again, these comparisons, made by comparators 15 and 25 in conjunction with buffers 16 and 26, may occur before the end of execution frame 201—that is, as shown in FIG. 2, by time 205.

If the comparisons of the output data streams of high-criticality applications ever detect diverging output, a fault has occurred. Upon detection of a fault, the entire system may shut down. Alternatively, parts of the system, for example one lane, may be shut down. As another alternative, the system could reset to a prior setting such as the beginning of the execution frame during which the fault occurred. Any other appropriate remedial or responsive action may be taken in the event of a fault.

To coordinate the distributed processing and comparison efforts, a schedule may describe which processing elements execute which applications at which times over the course of one or many execution frames. Further, a configuration file may contain such a schedule, and control modules 14 and 24 may each have a local copy of the configuration file. The schedule or configuration file may be in any appropriate and readable format or medium, and may be local to the appropriate I/O controller or stored at another place in the system. A schedule may be created manually or by inputting the system and application parameters to a computer program designed to build a schedule. As one example, high-criticality applications may be scheduled first, and low-criticality applications may then be scheduled throughout the as-yet-unallocated processing time.

A schedule may facilitate the operations of the control modules. For example, the execution diagram in FIG. 2 may describe the contents of a schedule dictating the execution of applications A, B, C, D, E, F, G, H, X, Y, and Z by processing elements 11 and 21 over execution frames 200 and 201. Implementing the schedule, control module 14 may send signals to comparator 15 and buffer 16, and to processing element 11 via bus 12. For instance, control module may signal to processing element 11 at time 203 that it should execute application A, and may send another signal to processing element 11 when it is time to switch to executing application X. Control module 14 may also signal comparator 15 when the execution of application X has begun, at which time comparator 15 may access the output data streams on buses 12 and 22 to compare those data streams. Moreover, given a schedule which describes the staggered execution of frame-locked applications, control module 14 may direct how and when buffer 16 should buffer input from either or both of bus 12 and 22. Similarly, control module 24 may implement the schedule by signaling to processing element 21, comparator 25, and buffer 26 at appropriate times.

A schedule ensures the efficient use of system resources, allowing a developer to detect potential slack time in the system before any execution takes place, and to re-allocate that slack time to appropriate applications. Additionally, the integrity of all high-criticality applications is maintained.

Figure 3:
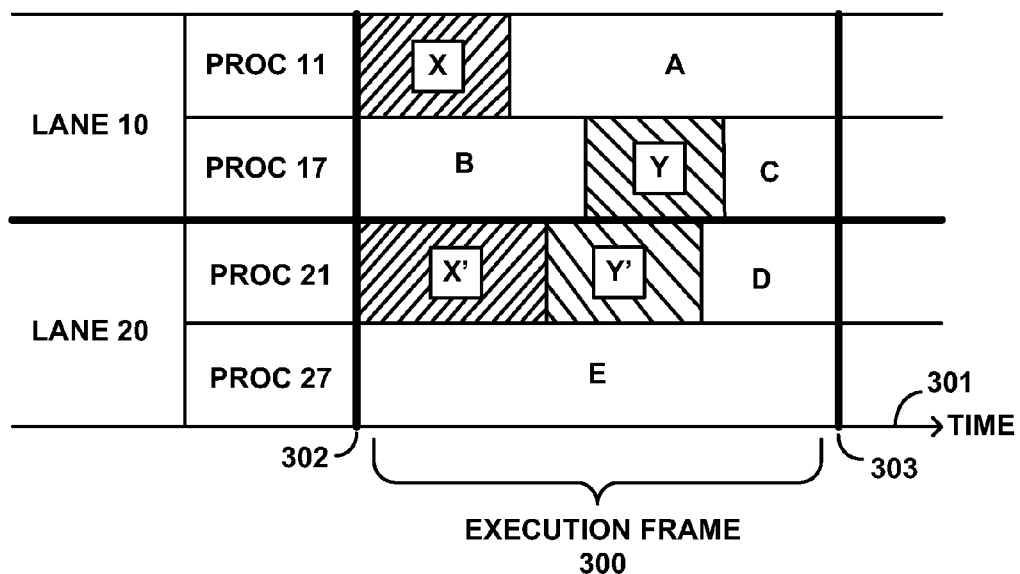
FIG. 3 is a timing diagram illustrating the execution of multiple programs of varying levels of criticality across two processing lanes, according to yet another embodiment of the invention.

FIG. 3 is a timing diagram for an exemplary embodiment that has multiple processing elements in each of two lanes. In particular, lane 10 has processing elements 11 and 17, and lane 20 has processing elements 21 and 27, all executing over execution frame 300. Lanes 10 and 20, and processing elements 11, 17, 21, and 27, may be arranged and configured as depicted in FIG. 1 and as explained above. Plotted along time axis 301, execution frame 300 begins at time 302 and ends at time 303. As with the FIG. 2 example, applications A, B, C, D, and E are low-criticality, or uncoupled, applications, and applications X and Y are high-criticality, or frame-locked, applications.

In the FIG. 3 embodiment, the high-criticality applications are distributed across multiple processing elements in lane 10. Processing element first executes application X and then executes application A for the balance of the execution frame. Processing element 17, on the other hand, executes application B, then application Y, and then application C over the course of execution frame 300. In lane 20, however, only one processing element executes high-criticality applications: processing element 21 first executes application X', then switches to executing application Y', and only then turns to executing application D. The other processing element of lane 20, processing element 27, only executes application E over execution frame 300. Such flexibility allows for many system and application needs to be met efficiently. Specifically, application E here needs an entire execution frame to execute, and applications X and Y need to be redundantly executed, and all of these requirements are scheduled within a single execution frame.

The embodiment of FIG. 3 may also be implemented using a schedule as described above. For example, control module 14 may coordinate the operations of processing elements 11 and 17 in terms of when and which applications are executed and may dictate the operations of comparator 15 and buffer 16, so that the relevant output streams are stored and compared at the relevant times. Further, control module 24 may coordinate the operations of processing elements 21 and 27 in terms of when and which applications are executed and may also dictate the operations of comparator 25 and buffer 25, so that the relevant output streams are stored and compared at the relevant times.

A variety of examples have been described above, all dealing with scalable self-checking processing platforms. However, those skilled in the art will understand that changes and modifications may be made to these examples without departing from the true scope and spirit of the present invention, which is defined by the claims. For example, the various units of the processing platform may be consolidated into fewer units or divided into more units as necessary for a particular embodiment. Accordingly, the description of the present invention is to be construed as illustrative only and is for the purpose of teaching those skilled in the art how to carry out the invention. The details may be varied substantially without departing from the spirit of the invention, and the exclusive use of all modifications that are within the scope of the appended claims is reserved.

What is claimed is:

1. A method comprising:
    during a first execution frame, a first processing element executing a first instance of a frame-locked application and a first uncoupled application;
    during a second execution frame, a second processing element executing a second instance of the frame-locked application and a second uncoupled application, different from the first uncoupled application, wherein a fault occurs when a first output stream from the first processing element's execution of the first instance of the frame-locked application differs from a second output stream from the second processing element's execution of the second instance of the frame-locked application.

2. The method of claim 1, wherein the first execution frame begins at the same time as the second execution frame, wherein the first execution frame ends at the same time as the second execution frame, and wherein the first execution frame and the second execution frame comprise a shared execution frame.

3. The method of claim 2, wherein during the shared execution frame, the first processing element executes a third uncoupled application.

4. The method of claim 2, wherein the first processing element is coupled to a first comparator and the second processing element is coupled to a second comparator, wherein each of the two comparators is enabled to compare output streams from both processing elements, and wherein the fault occurs when either of the two comparators indicates that the first output stream differs from the second output stream.

5. The method of claim 4, wherein the first processing element executes the first instance of the frame-locked application at a different time during the shared execution frame than the second processing element executes the second instance of the frame-locked application, wherein the first output stream is buffered, wherein the second output stream is buffered, and wherein the first comparator and the second comparator each compares the first output stream with the second output stream before the shared execution frame ends.

6. The method of claim 4, wherein a first control module controls the first processing element and the first comparator and a second control module controls the second processing element and the second comparator.

7. The method of claim 6, wherein a schedule describes times during the shared execution frame when the first processing element executes the first instance of the frame-locked application and the first uncoupled application and when the second processing element executes the second instance of the frame-locked application and the second uncoupled application.

8. The method of claim 7, wherein a first copy of the schedule is accessible to the first control module and a second copy of the schedule is accessible to the second control module, wherein, during the shared execution frame, the first control module switches the first processing element between executing the first instance of the frame-locked application and the first uncoupled application according to the schedule, and wherein, during the shared execution frame, the second control module switches the second processing element between executing the second instance of the frame-locked application and the second uncoupled application according to the schedule.

9. The method of claim 6, wherein the first control module comprises an application specific integrated circuit (ASIC) coupled to the first processing element and the second control module comprises an ASIC coupled to the second processing element.

10. A system comprising:
a first processing element connected to a first bus;
a second processing element connected to a second bus;
a first I/O controller comprising a first comparator and a first control module, wherein the first I/O controller is connected to the first bus and to the second bus, and wherein the first control module controls the first processing element and the first comparator; and
a second I/O controller comprising a second comparator and a second control module, wherein the second I/O controller is connected to the first bus and to the second bus, and wherein the second control module controls the second processing element and the second comparator, wherein during an execution frame, a first instance of a high-integrity application executes on the first processing element, generating a first output stream to the first bus, and a second instance of the high-integrity application executes on the second processing element, generating a second output stream to the second bus, wherein the first comparator compares the first output stream with the second output and detects a fault if the first output stream and the second output stream differ, and wherein the second comparator compares the first output stream with the second output stream and detects a fault if the first output stream and the second output stream differ; and
wherein during the execution frame, a first uncoupled application executes on the first processing element and a second uncoupled application executes on the second processing element.

11. The system of claim 10, further comprising a first copy and a second copy of a configuration file, wherein the configuration file describes for each processing element the execution frame in terms of periods spent executing the high-integrity application and periods spent executing uncoupled applications, wherein the first control module schedules operations of the first processing element and the first comparator according to the first copy, and wherein the second control module schedules operations of the second processing element and the second comparator according to the second copy.

12. The system of claim 10, wherein the first processing element executes the first instance of the high-integrity application at a different time during the execution frame than the second processing element executes the second instance of the high-integrity application, wherein the first output stream is buffered, wherein the second output stream is buffered, and wherein the first comparator and the second comparator compare the first output stream and the second output stream before the execution frame ends.

13. The system of claim 10, wherein the first control module and the second control module comprise application specific integrated circuits (ASICs).

14. The system of claim 10, wherein the high-integrity application is of higher criticality than the first uncoupled application and the second uncoupled application.

15. A system comprising:
a plurality of processing elements in a first processing lane connected to a first bus;
a plurality of processing elements in a second processing lane connected to a second bus;
a first I/O controller comprising a first comparator and a first control module, wherein the first I/O controller is connected to the first bus and to the second bus, and wherein the first control module controls the first processing lane and the first comparator; and
a second I/O controller comprising a second comparator and a second control module, wherein the second I/O controller is connected to the first bus and to the second bus, and wherein the second control module controls the second processing lane and the second comparator, wherein during an execution frame, a first instance of a high-integrity application executes on at least one processing element in the first processing lane, generating a first output stream to the first bus, and a second instance of the high-integrity application executes on at least one processing element in the second processing lane, generating a second output stream to the second bus, wherein the first comparator compares the first output stream to the second output stream and detects a fault if the first output and the second output differ, and wherein the second comparator compares the first output to the second output and detects a fault if the first output and the second output differ; and
wherein during the execution frame, a plurality of uncoupled applications execute on the processing elements in the first processing lane, at times when those processing elements are not executing the first instance of the high-integrity application, and on the processing elements in the second processing lane, at times when those processing elements are not executing the second instance of the high-integrity application.

16. The system of claim 15, wherein a schedule describes times during the execution frame when the processing elements in the first processing lane execute the first instance of the high-integrity application, when the processing elements in the first processing lane execute a first set of the plurality of uncoupled applications, when the processing elements in the second processing lane execute the second instance of the high-integrity application, and when the processing elements in the second processing lane execute a second set of the plurality of uncoupled applications.

17. The system of claim 16, wherein during the execution frame the first control module switches the execution of the processing elements in the first processing lane among the first instance of the high-integrity application and a first set of the plurality of uncoupled applications according to the schedule and wherein during the execution frame the second control module switches the execution of the processing elements in the second processing lane among the second instance of the high-integrity application and a second set of the plurality of uncoupled applications according to the schedule.

18. The system of claim 15, wherein the first instance of the high-integrity application executes at a different time during the execution frame than the second instance of the high-integrity application, wherein a first buffer buffers output streams to the first comparator, wherein a second buffer buffers output streams to the second comparator, and wherein the first comparator and the second comparator each compares the first output stream with the second output stream before the execution frame ends.

19. The system of claim 15, where the first control module and the second control module comprise application specific integrated circuits (ASICs).

20. The system of claim 15, wherein each of the plurality of uncoupled applications is of lower criticality than the high-integrity application.

* * * * *